United States Patent

[11] 3,573,573

[72] Inventor Richard L. Moore
Poughkeepsie, N.Y.
[21] Appl. No. 786,068
[22] Filed Dec. 23, 1968
[45] Patented Apr. 6, 1971
[73] Assignee International Business Machines Corporation
Armonk, N.Y.

[54] MEMORY CELL WITH BURIED LOAD IMPEDANCES
5 Claims, 8 Drawing Figs.

[52] U.S. Cl. 317/235, 307/238, 307/279, 307/299, 307/303, 148/175
[51] Int. Cl. H01l 19/00
[50] Field of Search 317/235/22, 235/22.1, 235/22.11; 307/213, 238, 292, 303, 299 (A), 279; 340/173

[56] References Cited
UNITED STATES PATENTS

| | | | |
|---|---|---|---|
| 3,211,972 | 10/1965 | Kilby et al. | 317/235 |
| 3,218,613 | 11/1965 | Gribble et al. | 317/235 |
| 3,340,406 | 9/1967 | Kilby | 317/235 |
| 3,409,483 | 11/1969 | Watson | 317/235 |

FOREIGN PATENTS

| | | | |
|---|---|---|---|
| 272,904 | 12/1961 | Netherlands | 317/235 |

*Primary Examiner*—Jerry D. Craig
*Attorneys*—Hanifin and Jancin and James E. Murray

ABSTRACT: This specification describes semiconductor storage cells for use in monolithic memories. These cells each have two planar transistors formed on a single surface of a monolithic chip. The planar transistors are coupled together to form a bistable circuit and are supplied power from a voltage distribution layer of the chip under the planar transistors so that the load elements for the storage cells are formed vertically through the monolithic chip between the voltage distribution layer and the planar transistors.

INVENTOR
RICHARD L. MOORE

BY James E. Murray

ATTORNEY

MEMORY CELL WITH BURIED LOAD IMPEDANCES

BACKGROUND OF THE INVENTION

The present invention relates to semiconductor storage cells and more particularly to semiconductor storage cells employing crosscoupled semiconductor devices as the active elements of the cell.

Since storage cells of monolithic memory storage chips are comprises of planar circuit elements, the number of storage cells that can be placed on a chip of given dimensions, or in other words the storage cell bit density of a chip, is determined by the surface area required for each cell on the chip. Furthermore, the surface area taken up by these storage cells is dependent upon the surface area required by their constituent circuit elements. Therefore in accordance with the present invention, the bit density of the storage chip is increased by arranging certain of the circuit elements of the storage cell normal to the surface of the chip and underneath other circuit elements of the cell so that these circuit elements do not take up any surface area.

As like storage cells in most monolithic memories, storage cells of the present invention have in one surface of a monolithic chip two planar transistors that are crosscoupled to form a bistable circuit. However, the storage cells of the present invention differ from previous storage cells in that the loads for each of the crosscoupled transistors is vertically positioned in the monolithic chip underneath the particular transistor. This is accomplished by feeding the driving potential for the transistors to a low-impedance, current-carrying layer below the transistors so as to form a voltage-distributing plane beneath the transistors. The load impedance for each transistor will then be a distributed vertical impedance beneath the particular transistor. The characteristics of this impedance will be determined by the nature of the chip between the voltage distribution plane and the transistor. If there is a rectifying junction between the voltage distributing plane and the transistor, the load for the transistor is a distributed diode. If there is no such rectifying junction the load for the transistor is resistive.

Therefore, it is an object of the present invention to provide storage cells which can be fabricated into monolithic memories.

It is another object of the present invention to provide a storage cell which takes up very little space on monolithic chips.

It is a further object of the invention to provide low-cost high-speed storage cells.

DESCRIPTION OF THE DRAWINGS

The foregoing and other objects, features and advantages of the invention will be apparent from the following more particular description of the preferred embodiments of the invention as illustrated in the accompanying drawings, of which:

Referring to FIG. 1, transistors T1 and T2 are double emitter transistors with the base of each connected to the collector of the other and the emitter *e2* of one connected to the emitter *e3* of the other. The connected emitters *e2* and *e3* are tied to the WL word line terminal 10 so that potential supplied to the storage cell may be varied for reading and writing operations. The collectors of the transistor T1 are connected to the positive terminal 12 through diode D1 and the collector of transistor T2 is connected to that same positive terminal 12 through the diode D2.

Figure 1:
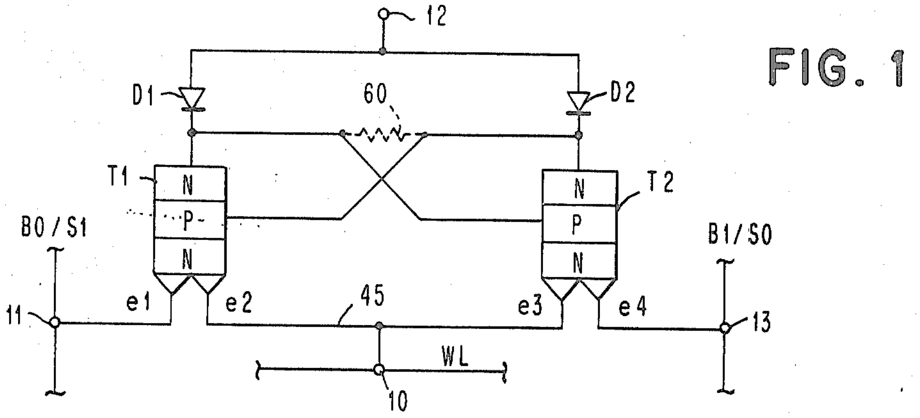
FIG. 1 is a schematic of a storage cell which can be fabricated in accordance with the present invention.

The emitters *e1* and *e4* of the transistors T1 and T2 go respectively to the B0/S1 and B1/S0 bit line terminals 11 and 13 of the storage cell. Like the potential on the word line WL, the potentials on the bit lines B1/S0 and B0/S1 are controlled to vary the state of the cell. Also the bit lines are connected to a sense amplifier (not shown) for the detection of the output of the signals from the storage cell.

Assume now that the storage cell is merely storing information and that it is storing a digital 1 as opposed to a digital 0. Then transistor T1 is conducting and transistor T2 is held nonconducting by the crosscoupling of the base of transistor T2 to the collector of transistor T1. The potential supplied between the word line WL terminal and the positive terminal 12 is sufficient to heavily forward-bias only diode D1. Thus, current used to maintain the transistor T1 in conductance passes through diode D1 and transistor T1.

While transistor T1 is conducting the voltage across diode D2 is not sufficient to maintain diode D2 fully conducting. Diode D2 is a nonlinear device and with a small current passing through it, diode D2 has high impedance. Using a diode load in this manner helps to reduce the power loss of the cell.

In order to maintain the bistability of the storage cell or in other words in order to maintain one of the transistors off while the other is conducting, it is necessary that the open loop gain from the base of either one of the transistors to the collector of the other be greater than 1. This is accomplished by insuring that the dynamic impedances of diodes D1 and D2 are larger than the dynamic impedances of the base emitter diodes of transistors T1 and T2. How this is done will be discussed in more detail in connection with FIGS. 2 and 3.

While the cell is not being interrogated, the potentials supplied to the emitters *e1* and *e4* through the bit lines B1/S0 and B0/S1 are more positive than the potential supplied to the emitters *e2* and *e3* from the work line WL. Thus with transistor T1 conducting, current will travel from the terminal 12 through the diode D1, transistor T1 to the work line terminal 10 and back bias the base to emitter junctions of emitters *e1* and *e4* so that the B0/S1 and B1/S0 sense lines are isolated from the information stored in the storage cell.

Now assume the information stored in the cell is to be read from the cell. Then the voltage on the word line WL is raised This rise in voltage places the emitters *e2* and *e3* above the potential at emitters *e1* and *e4*. Since transistor T1 is conducting, current then flows through diode D1 to transistor T1 to the B0/S1 sense line. No current flows through transistor T2 to the B1/S0 sense line because transistor T2 is not conducting. A differential amplifier (not shown) senses the current difference between the B0/S1 sense line and the B1/S0 sense line and determines that a 1 is stored in the cell.

If a 0 is stored in the cell when the potential on the word line WL is raised, then transistor T2 is conducting instead of transistor T1 so that current flowing through transistor T2 and diode D2 to the word line WL will switch and flow to the B0/S1 bit line through emitter *e4*. No current flows through the emitter *e1* to the B0/S1 sense line while T2 is conducting because transistor T1 is biased nonconducting by the crosscoupling between transistors T1 and T2. Therefore there is a differential current between the B0/S1 and B1/S0 sense lines that would be sensed by the sense amplifier which this time would indicate that a 0 was stored in the storage cell.

After the completion of a read cycle, the potential on a word line WL is lowered until the potential at the emitters *e2* and *e3* is lower than the potential on emitters *e1* and *e4*. Therefore any current flow through transistor T1 or T2 will switch back to the inboard emitters *e2* or *e3* and pass to the word line WL thereby isolating the bit lines from the information stored in the storage cell.

Assume now that a 1 is stored in the storage cell and you wish to write a 0 into the storage cell, that is, to change the state of the cell so that transistor T2 conducts instead of transistor T1. This is accomplished by a coincidence of signals on the word line WL and on the B0/S1 bit line. The potential on the word line WL and the B0/S1 bit line are both increased while the potential on the B1/S0 word line is maintained at its original level which is below the raised levels of the word line WL and the B0/S1 bit line. This causes transistor T2 to conduct through emitter *e*4 to the B1/S0 sense line. Once transistor T2 starts conducting the potential on the B0/S1 sense line and the word line WL are reduced so that the word line WL is lower than the B1/S0 and B0/S1 sense lines which are biased at the same potential. Therefore, conduction occurs through emitter *e*3 and the sense lines are isolated from the information in the storage cell. If a 1 is to be stored in the cell, the B1/S0 bit line is raised along with the word line WL and the B0/S1 bit line is maintained at its initial low value so that transistor T1 conducts through emitter *e*1 and transistor T2 is held off by the crosscoupling.

Figure 2:
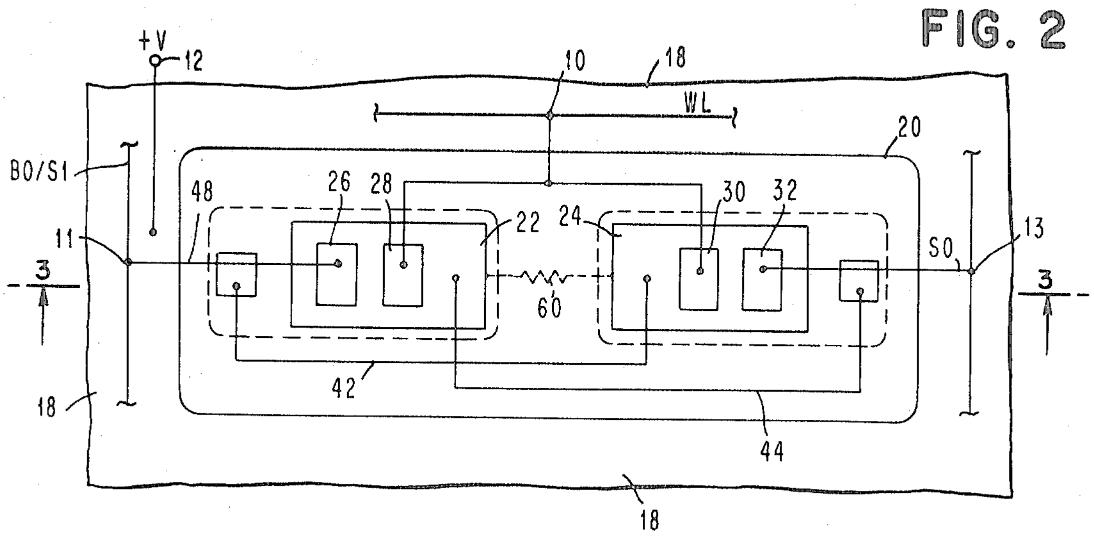
FIG. 2 is a plan view of the storage cell of FIG. 1 fabricated in accordance with the present invention.
Figure 3:
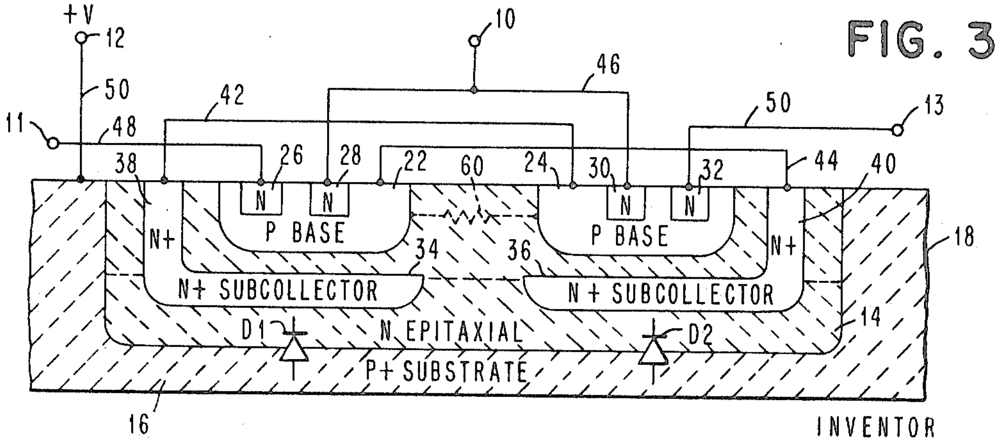
FIG. 3 is a section taken along line 3—3 in FIG. 2.

In accordance with the present invention, the above-described storage cell is manufactured in monolithic form as illustrated in FIGS. 2 and 3. As shown, an N-doped epitaxial layer 14 is grown on a low-resitivity P+ substrate 16. A P+ diffusion 18 through this epitaxial layer 14 to the P+ substrate forms an isolation pocket 20 of N-type epitaxial material. In this pocket 20 there are two P base diffusions 22, 24, one for each of the two transistors T1 and T2. In each of these base diffusions, 22 and 24, there are two N emitter diffusions 26, 28 and 30, 32, respectively. Under each base diffusion 22 or 24 there is a low-resistivity subcollector diffusion 34 or 36. These subcollector diffusions are each connected to the surface by an N+ diffusion 38 or 40.

A shown, each base diffusion 22 and 24 is connected to the subcollector diffusion 34 and 36 of the other transistor by metalization 42 and 44 connecting the base diffusions to the diffusions 38 and 40. The metalization 42 and 44 constitutes the crosscoupling between the transistors schematically illustrated in FIG. 1. Additional metalization 46 connects two of the emitter diffusions 28 and 30 together and to the work line terminal 10 while the other emitter diffusions are connected to the B0/S1 and B1/S0 bit line terminals, by metal lines 48 and 50, respectively. Finally, the isolation diffusion has a metalization path 52 connecting it to the terminal 12 as illustrated.

It can be seen that the storage cell illustrated is formed in this one isolation pocket 20. Power from the positive terminal 12 flows through the isolation diffusions 18 to the high-conductivity P+ substrate 16 which acts as a distributing plane for voltage. This biases the substrate 16 positive with respect to the epitaxial layer 14 above it. Current therefore passes from the substrate 16 through epitaxial layer 14 to the N+ subcollector regions 34 and 36 where it supplies power to the collector of the transistors T1 and T2. The impedance provided by this path is essentially a distributed diode impedance formed by the junction of the N epitaxial and P+ substrate underneath the subcollector diffusion. Thus it can be seen the load impedance for the storage cell shown in FIG. 1 is a vertical impedance which occurs in the body of the monolithic chip. Therefore no surface area is required for these impedances reducing the required surface area needed for the storage cell. The collector-base and the base-emitter junctions of the transistors T1 and T2 of course occur at the underside of the base diffusions 22, 24 and the bottoms of the emitter diffusions 26, 28, 30, 32.

Figure 4:
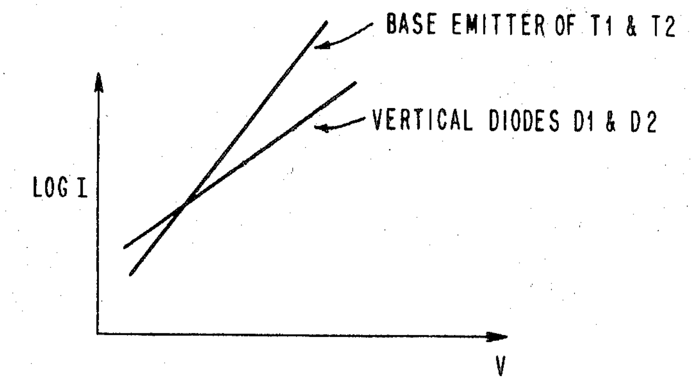
FIG. 4 is a diode characteristic curve showing *V-I* characteristics of the base to emitter junctions of the transistors and of the load diodes of the storage cell illustrated in FIGS. 1—3.
Figure 5A:
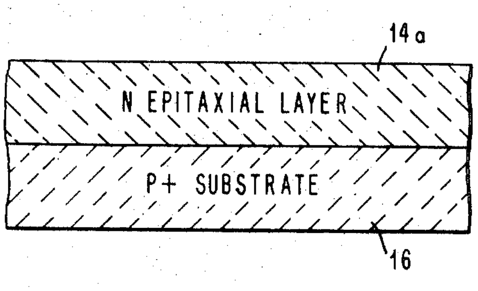
FIG. 5 shows in steps how the storage cell of the present invention can be fabricated.
Figure 5B:
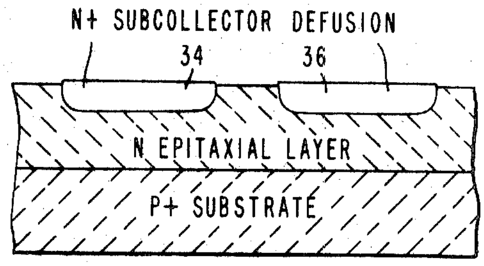
Figure 5C:
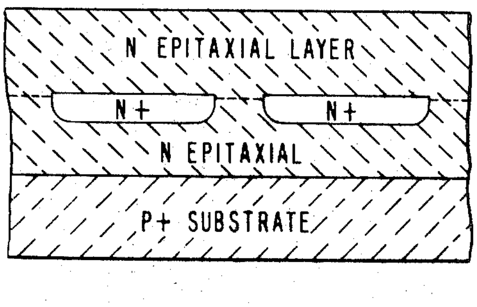
Figure 5D:
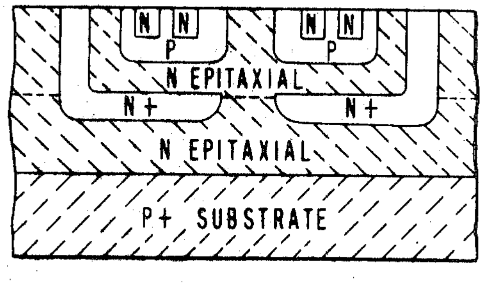

As pointed out in connection with the discussion of FIG. 1, the dynamic impedance of the diodes D1 and D2 is twice that of the dynamic base to emitter impedance of the transistors T1 and T2. This is accomplished by the use of higher doping impurity concentrations in the P+ substrate relative to the N-epitaxy than in the emitter diffusion relative to the base. As pointed out, higher impedance of the diodes is necessary to assure the bistability of the storage cell. FIG. 4 illustrates how the V-I characteristics of the emitters of transistors T1 and T2 and of the diodes D1 and D2 differ as a result of the higher impurity concentrations in the P+ substrate.

In the illustrated cell, the distance between transistors T1 and T2 is sufficiently large to maintain the parasitic horizontal impedance 60 large enough to prevent a serious effect on the operation of the storage cells. The drawings are for purposes of illustration and do not illustrate the actual relative dimensions of the storage cell.

The storage cell shown in FIGS. 2 and 3 may be fabricated as illustrated in FIG. 5. First an N epitaxial layer 14*a* is grown on the P+ substrate 16. Thereafter the epitaxial growth is interrupted and the subcollector diffusions 34 and 36 are made. Once the subcollector diffusions are finished, N epitaxial growth is resumed as shown at 14*b*. When the N epitaxial region is completed, the necessary base, emitter, connective and isolation diffusions can be made in the usual manner.

In the described embodiment, diodes were employed as the load elements. Resistive load elements can also be supplied by the present invention. By providing a thicker N epitaxial region 14 a resistive impedance characteristic may be obtained between the subcollector diffusions 34 and 36 and the substrate 16. Furthermore, the rectifying junction between the substrate 16 and the epitaxial 14 region can be eliminated by making the substrate out of N+ material. However, if this is done the vertical resistance through the epitaxial layer 14 must be sufficiently large to assure bistability. In addition, a metal layer should be plated under the N+ substrate to assure an equal distribution of voltage under both subcollector diffusions. Also, the isolation diffusions 38 and 40 between cells are not necessary if the impedance of the epitaxial layer is high enough. Therefore, while the invention has been particularly shown and described with reference to preferred embodiments thereof, it will be understood by those skilled in the art that various changes in form and details may be made therein without departing from the spirit and scope of the invention.

I claim:

1. A monolithic storage cell comprising:

a. a silicon substrate;

b. an epitaxially grown layer on the substrate forming a rectifying junction between the substrate and the epitaxially grown layer;

c. two low-impedance subcollector diffusions in the epitaxially grown layer;

d. base diffusions in the surface of the epitaxially grown layer over the subcollector diffusions;

e. emitter diffusions in the base diffusions;

f. means electrically coupling each of the subcollector diffusions to the base diffusions over the other subcollector diffusion to form two crosscoupled transistors;

g. means electrically connecting the emitter diffusions to addressing means for the storage cell; and h. means for supplying collector potential to the silicon substrate so that collector load impedances for the transistors are formed between the substrate and the subcollector diffusions.

2. The storage cell of claim 1 wherein the substrate contains greater concentrations of doping impurities than the base diffusions to assure bistability of the storage cell.

3. The storage cell of claim 2 wherein there are two emitter diffusions in each base diffusion.

4. The storage cell of claim 3 including word line means coupled to one of the emitter diffusions in each base diffusion and separate bit line means coupled to the other emitter diffusion in each base diffusion.

5. The storage cell of claim 4 wherein the potential supplied between the work and bit line means and the silicon substrate is sufficient to heavily forward-bias only the collector load impedance for one of the crosscoupled transistors biased conductive.